Patented Feb. 18, 1930

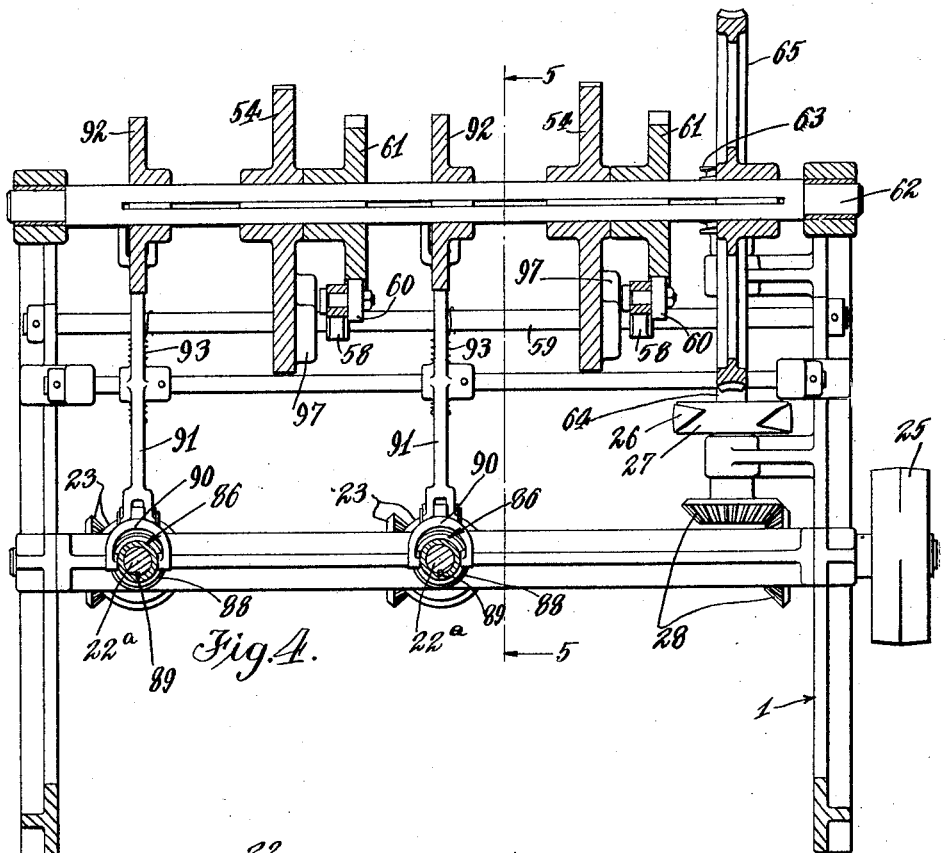
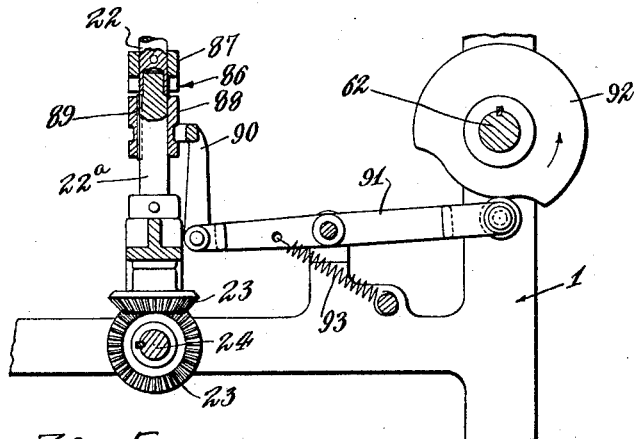

1,747,706

UNITED STATES PATENT OFFICE

HJALMAR GORANSON AND DAVID GORANSON, OF SAN JOSE, CALIFORNIA, ASSIGNORS TO CALIFORNIA PACKING CORPORATION, OF SAN FRANCISCO, CALIFORNIA, A CORPORATION OF NEW YORK

FRUIT-PEELING MACHINE

Application filed October 15, 1927. Serial No. 226,300.

This invention relates to a machine for peeling fruit, and the invention includes features which may be regarded as improvements on the fruit peeling machine disclosed in our former application, Serial No. 139,355, filed October 4, 1926. The machine disclosed in our former application was of a rotary type and involved the use of a rotary table carrying a plurality of rotary peeling mechanisms. The fruit to be peeled was presented to the feeding mechanism and automatically moved down through it as the table rotated on its vertical axis.

The present invention is embodied in a machine in which the fruit rotates and the peeling cutters are relatively stationary, and in this machine we dispense with the rotary table, but we provide a plurality of peeling units mounted alongside of each other and automatically driven by the same driving means. One of the operations of the machine consists in snipping off the lower end of the fruit and this operation is preferably performed before the fruit is advanced through the peeling mechanism. The general object of this invention is to provide simple mechanism for accomplishing this result and for moving the fruit thereafter into alignment with the peeling mechanism, through which the fruit is then advanced.

In the machine disclosed in our former application referred to above, the peeling mechanism was mounted on the upper end of a rotary carriage, which was rotated automatically as the fruit passed down through it. The construction involved the use of a tubular guide through which the fruit passed. In the present invention one of the objects is to simplify this construction and to provide simple means for guiding the fruit on each side of the point of application of the peeling cutters.

A further object of the invention is to provide a construction for a peeling machine which adapts it readily to be modified to increase or decrease the capacity; in other words, one of our objects is to provide a machine of gang type, consisting of a number of units, which units can be increased as may be desired without necessitating any alterations in the general arrangement of the mechanism.

A further object of the invention is to improve the general construction of fruit peeling machines.

Further objects of the invention will appear hereinafter.

The invention consists in the novel parts and relative combination of parts to be described hereinafter, all of which contribute to produce an efficient fruit peeling machine.

A preferred embodiment of the invention is described in the following specification, while the broad scope of the invention is pointed out in the appended claims.

In the drawing:

Figure 4 is a horizontal section through the cam shaft of the machine taken about on the line 4—4 of Figure 2.

Figure 5 is a vertical section taken about on the line 5—5 of Figure 4, and particularly illustrating a cam controlled clutch for connecting and disconnecting the drive to the spindle which rotates the fruit.

Figure 1:
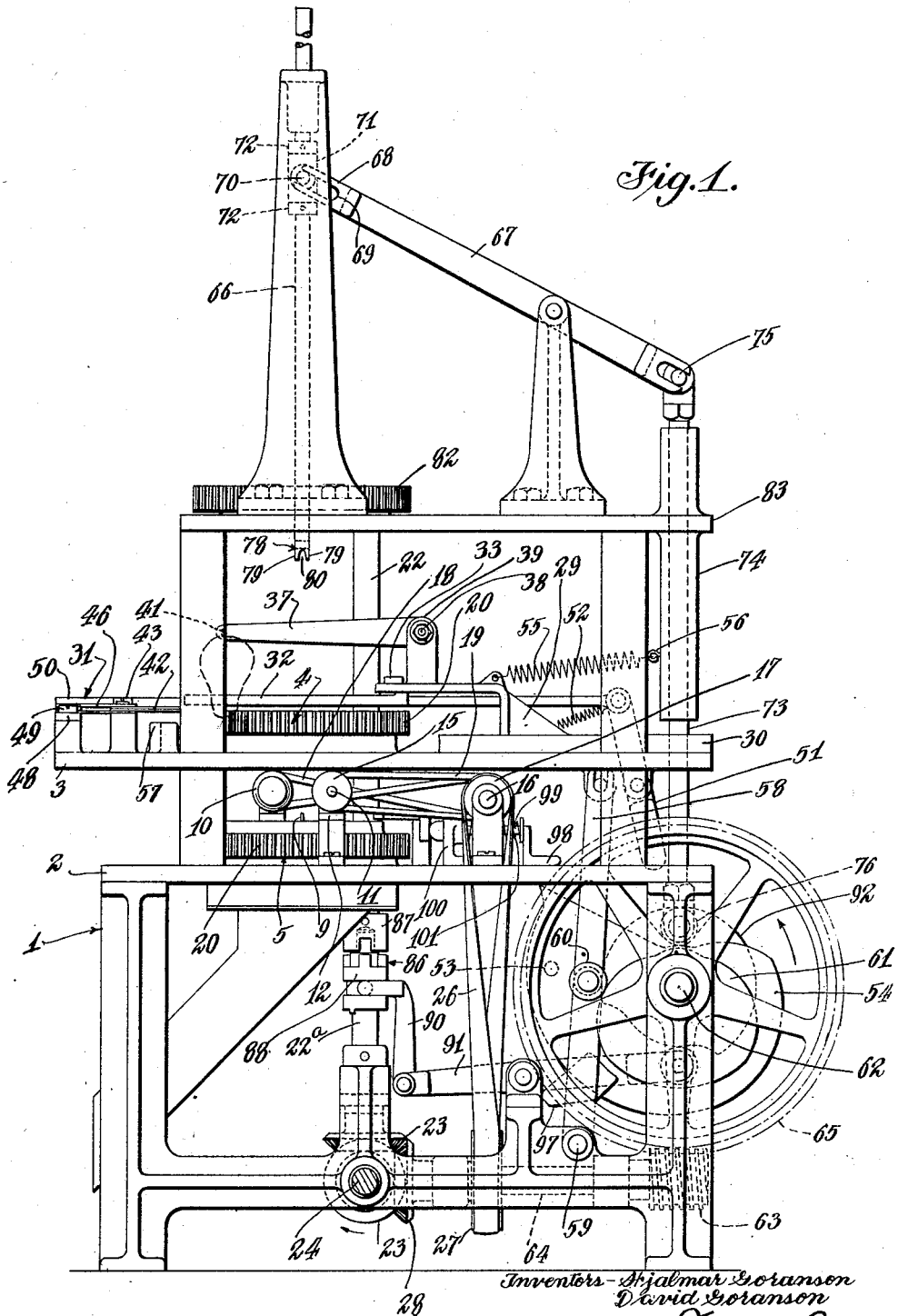
Figure 1 is a side elevation of a machine embodying the invention, certain parts being broken away and others shown in cross-section.

Referring more particularly to the parts, 1 represents the frame of the machine, which frame preferably includes a lower table 2 and an upper table 3. The peeling mechanism is mounted on or between these two tables and is formed in a plurality of units. In the present machine there are two peeling units disposed alongside of each other and facing the same direction, so that the machine operator can stand in front of the machine and feed fruit to it by hand. If desired, the two units may perform their cycles in different phases, that is to say, the two mechanisms are not in step with each other.

This arrangement would enable the moment for feeding the fruit to one of the mechanisms to alternate with the moment for feeding fruit to the other mechanism.

We shall now proceed to describe one of the units of the peeling mechanism. Each of these units preferably comprises an upper ring 4 rotatably mounted in an opening in the upper table 3, and in similar rotation ring 5 mounted in co-axial alignment with the upper ring but supported in the lower table 2. In the operation of the machine the fruit, for example, a pear, is forced down through the upper ring 4, and when this occurs the fruit is held by two impaling blades 6 which project inwardly at diametrically opposite points of the ring 4. The inner edges 7 of these impaling blades are disposed apart so as to leave a gap 8 between them for a purpose which will appear hereinafter. As the fruit passes down through the ring, its lower end comes in contact with a transverse guiding blade 9 which extends diametrically across the ring 5 and is in the same plane with the impaling blade 6. As the fruit descends this blade 9 passes into the cut in the fruit formed by the impaling blade 6. These impaling blades 6 and 9 operate to rotate the fruit as it passes the peeling cutters.

The peeling cutters are preferably in the form of two cone shaped knives 10 (see Figure 3), each cutter being carried on a cutter shaft 11, each cutter shaft being mounted in a corresponding bracket 12 which is supported on a vertical pivot pin 13 on the lower table 2. These cutters 10 are disposed diametrically opposite to each other and as the fruit descends and rotates on its longitudinal or vertical axis the cutters 10 will be yieldingly held against the face of the fruit on opposite sides. For this purpose springs 14 are provided, which are connected with the brackets 12 which house the cutter shafts.

In order to rotate the peeling cutters 10, each cutter shaft 11 is provided with a belt pulley 15 which is mounted in the same plane as the axis of the fixed pivot 13 on which the cutter shaft may swing. The two shafts 11 are substantially parallel with each other and with the pulley shaft 16 mounted on the lower table 2, and this shaft carries pulleys 17 connected by belts 18 and 19 with the pulleys 15.

The belt 18 is twisted so as to enable the cutter shafts to be driven in opposite directions.

Figure 2:
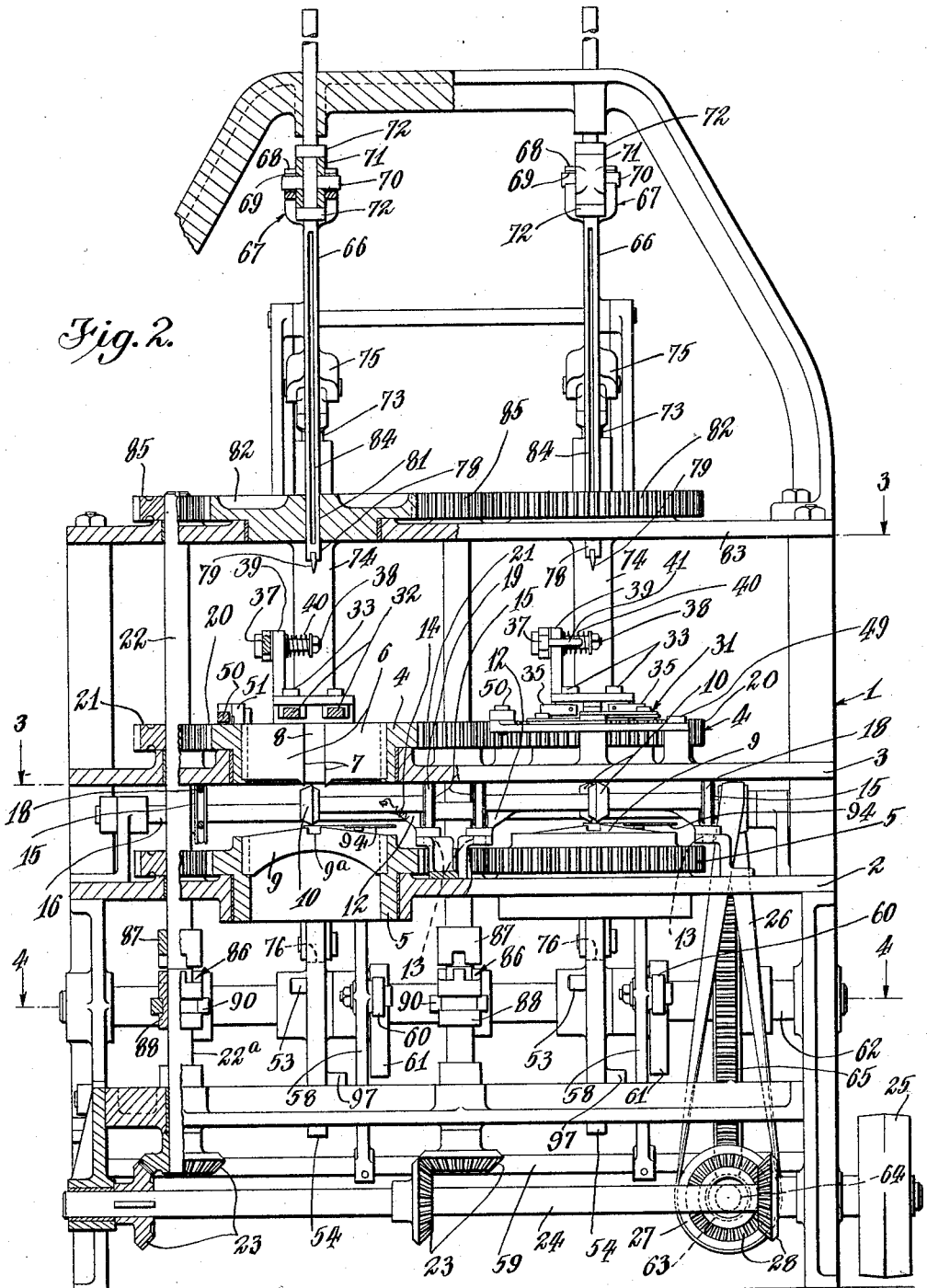
Figure 2 is a partial section and front elevation of the machine shown in Figure 1. This view may be considered as a sectional elevation taken about on line 2—2 of Figure 3.

The two rings 4 and 5 are not connected with each other but are driven at precisely the same number of revolutions per minute, that is to say, they are driven in unison. For this purpose the outer edge of each ring is provided with gear teeth 20 so that each ring constitutes a gear wheel. Each of these rings meshes with the pinion 21 carried on the vertical shaft 22 which extends up through the tables 2 and 3 and which is driven at its lower end through the medium of a pair of bevel gears 23, driven by the pulley shaft 24 of the machine (see Figure 2). The pulley shaft 24 carries a belt pulley 25 which may be driven at a suitable speed by means of an ordinary belt. The pulley shaft 16 already referred to may be driven by means of a twisted belt 26 extending up from the belt pulley 27 (see Figure 2) which is driven through suitable bevel gears 28 from the main pulley shaft 24.

We shall now describe the fruit holder and the snipping device with which the fruit holder cooperates to effect the snipping of the stem end of the fruit, after which the fruit holder presents the fruit in line with the peeling mechanism. This mechanism is particularly illustrated at the right-hand side of Figure 3, and preferably comprises a fruit holder carriage 29 which is in the form of a plate guided to slide between guide sheets 30 mounted on the upper face of the upper table 3. This carriage is mounted so that it reciprocates on a line passing through the vertical axis of its corresponding peeling mechanism, and on this same line a snipping device 31 is mounted. On the carriage 29 we mount two holding arms 32 which are supported on corresponding pivot pins 33. These arms 32 are pulled toward each other yieldingly by a column coil spring 34. The outer ends of the arms 32 are fashioned into jaws 35 which form a rudimentary cradle, said jaws being preferably bent as indicated, and provided with rollers 36 disposed at a slight angle to each other and in a position to engage the side faces of the fruit at substantially diametrically opposite points.

We provide means to cooperate with the holding arms 32 to hold the fruit upright in the cradle formed by the jaws 35. For this purpose we provide a centering arm 37 which is pivotally mounted by means of a bolt 38 on the lug 39. The bolt 38 is provided with a spring 40 which offers a frictional resistance to the swinging movement of the arm 37 and thereby operates to hold the arm 37 in any position in which it is placed. The outer end of the arm 37 is provided with an impaling blade or finger 41 which is engaged with the upper end of the fruit for example, a pear, when the same is placed in the holder.

Figure 3:
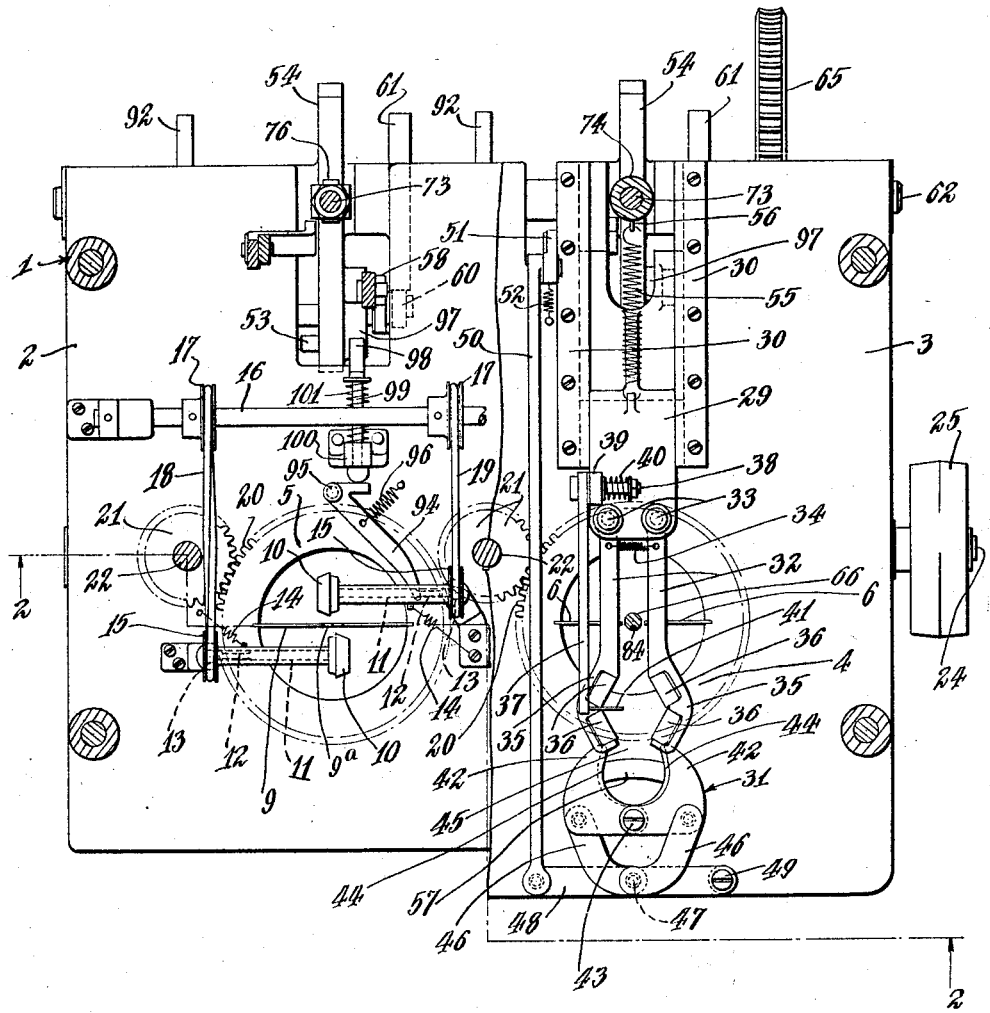
Figure 3 is a horizontal section taken through the machine at different levels, as indicated by the line 3—3 on Figure 2.

Each snipping device 31 includes a pair of oppositely disposed snipper blades 42 (see Figure 3) which are mounted to rotate on a fixed pivot 43 on the lower table 2, and near the front. These blades have beveled cutting edges 44 and the blades are normally held apart, as indicated in Figure 3, so that a gap or throat 45 is formed through which the lower end of the fruit can pass in or out between the blades. In other words, this throat is disposed on the line extending from the pivot 43 toward the central axis of the peeling mechanism.

The snipping blades 42 are actuated by links 46 which may have a common pivot connection 47 with a lever 48 attached by pivot pin 49 to the upper face of the table 2. This lever 48 is actuated periodically by link 50 which extends over to the back end of the machine and is attached to a rock lever 51 (see Figure 1). A coil spring 52 normally holds the lever 51 in the position in which it is illustrated in Figure 1. This will hold the snipper blades 42 in their open position, as shown in Figure 3.

At the proper moment in the cycle of operations of the machine this lever 51 is actuated by a pin 53 mounted on a cam wheel 54.

The carriage 29 is normally held in its rearmost position by means of a coil spring 55 (see Figures 1 and 3), which is anchored at 56 on the part of the frame.

When the fruit is held with its lower end between the blades of the snipping device, its lower end rests upon a segment 57 which holds the fruit in the proper position to have its lower end snipped off.

The carriage 29 of each fruit holder is reciprocated through the medium of a lever 58 (see Figure 1), the lower end of which is pivotally mounted at 59 on the frame of the machine. This lever is provided at the intermediate point with a roller 60 cooperating with a cam 61 on a cam-shaft 62. This cam-shaft carries all the cams of the machine and is driven by a worm 63, carried on the counter-shaft 64 driven through the bevel gears 28 already referred to. This worm 63 meshes with a worm wheel 65 on the cam-shaft 62 (see Figure 4). After the stem end of the fruit has been snipped off, the holder carriage 29 slips rearwardly from the position in which it is shown in Figure 3 until the axis of the fruit is brought into line with the axis of the peeling mechanism, whereupon a pusher stem 66 descends to engage the upper end of the fruit and force the same down through the peeling mechanism. This pusher stem 66 is moved down at the proper moment in the cycle of the operation of the machine through the agency of a lever 67 which has a yoke 68 at one end with slots 69 engaging pin 70 on a sleeve 71 carried between collars 72 on the stem. This connection does not interfere with the subsequent rotation of the stem. However, when the stem comes down to engage the upper end of the fruit, it is preferably not rotating. The lever 67 is actuated by an actuating stem 73 which passes up through a guide 74 forming part of the frame, the upper end of the actuating stem being provided with a pin-and-slot connection 75 with the rear end of lever 67. This stem 73 carries a roller 76 at its lower end which runs on a cam 54 on the cam-shaft 62 (see Figure 1). The lower end of the pusher stem is provided with a bifurcated tip 78 having two separated spurs 79 with a gap or throat 80 between them.

After the pusher stem 66 has engaged the upper end of the fruit and shoved its lower end down onto the impaling blades 6 the pusher stem 66 then commences to rotate, and at the same time rotation of the rings 4 and 5 commences. In order to accomplish this, each stem 66 passes down through a center opening 81 in a gear wheel 82 rotatably mounted in the cover table 83 of the machine. Each stem 66 has a spline connection, including a slot 84, extending longitudinally in the pusher stem. Through the medium of this spline connection the rotation of the pusher stem is effected. The gear wheel 82 is rotated by pinion 85 carried on the upper end of the shaft 22 already described. Of course, the two pinions 21 are of the same diameter as the pinion 85, so that when the rings 4 and 5 rotate they rotate in unison with the stem 66.

In order to commence the rotation of the stem 66 and the rings 4 and 5 at the proper moment, the lower end of each shaft 22 is provided with a clutch 86 including a fixed clutch member 87 on the shaft 22, and a movable clutch member 88 (see Figure 5). The clutch member 88 is in the form of a collar mounted on an extension 22$^a$ which forms the lower end of the shaft 22. The collar 88 has a splined connection 89 with its extension 22$^a$, and the clutch is closed at the proper moment through the agency of a yoke 90 which engages the sliding collar 88 and which is connected to a cam lever 91 actuated by cam 92 on the cam-shaft 62. The clutch is normally held open by coil spring 93 connecting the lever 91 with the frame 1 of the machine. As the pusher stem descends, it shoves the fruit down between the cutters 10 and spreads them apart to permit the fruit to pass them. As the fruit passes, these cutters, of course, remove the peeling.

In connection with the operation of this machine it should be noted that the gap 8 (see Figure 2) between the impaling blade 6 operates to leave the core of the fruit intact, that is to say, this core is not cut in any way by the blade 6. At the termination of the peeling operation the flower end of the fruit will be located adjacent the upper edge of the blade 9 (see Figure 2), at which point a shallow notch 9$^a$ is formed. When the fruit is in this position, that is to say, before the core has been entirely cut through by the blade 9 (by reason of the notch 9$^a$), a snipper device operates to snip off the flower end of the fruit. This snipper device is in the form of a blade 94 (see Figure 3) which is mounted on a pivot 95 on the lower table 2. This blade 94 is normally held retracted by a coil spring 96, but is periodically actuated by cam lug 97 attached to the cam 54 already described. This cam lug at each revolution of the cam strikes the rear end of a plunger 98 (see Figures 1 and 3). This plunger has a stem 99 guided to slide through a bracket 100 supported on the lower table 2. A coil spring 101 disposed around the stem 99 normally holds this plunger retracted.

It is understood that the embodiment of the invention described herein is only one of the many embodiments this invention may take, and we do not wish to be limited in the practice of the invention, nor in the claims, to the particular embodiment set forth.

What we claim is:

1. In a fruit peeling machine, the combination of a frame, peeling mechanism supported on the frame, a snipping device supported on the frame for severing the end of the fruit, a fruit-holder guided to slide on the frame, and means for actuating the fruit holder to move the fruit across the space between the snipping device and the peeling mechanism.

2. In a fruit peeling machine, the combination of a frame, peeling mechanism supported on the frame, a snipping device supported on the frame for severing the end of the fruit, a carriage guided to slide on the frame, a fruit holder supported on the carriage, means for actuating the carriage to present the fruit to the snipping device and for aligning the fruit thereafter with the peeling mechanism, and means for advancing the fruit from the holder past the peeling mechanism.

3. In a fruit peeling machine, the combination of a frame, a peeling mechanism supported on the frame, a snipping device supported on the frame and having a throat opening toward the peeling mechanism, a fruit holder guided to slide on the frame, means for actuating the fruit holder to move the end of the fruit through the throat into the snipping device, means for actuating the snipping device to sever the end of the fruit, the said actuating means for the fruit holder operating thereafter to align the fruit with the peeling mechanism, and means for advancing the fruit through the peeling mechanism.

4. In a fruit peeling machine, the combination of a frame, peeling mechanism supported on the frame, a snipping device supported on the frame having two pivotally mounted cutters with a throat between the same disposed toward the said peeling mechanism, a fruit holder guided to move transversely on the frame to move the fruit from the snipping device into alignment with the peeling mechanism, and means for advancing the fruit from the fruit holder past the peeling mechanism.

5. In a fruit peeling machine, the combination of a frame, peeling mechanism supported on the frame, a snipping device, a carriage with a fruit holder operating to support the fruit when the snipping device is actuated and operating to move the fruit into alignment with the peeling mechanism, said fruit holder having oppositely disposed jaws for holding the fruit, and means for advancing the fruit down between the jaws and through the peeling mechanism.

6. In a fruit peeling machine, the combination of a frame, a peeling mechanism supported on the frame, a snipping device supported on the frame to one side of the peeling mechanism, a fruit holder having a pair of oppositely disposed jaws for holding the fruit, means for resiliently urging the jaws toward each other, means for actuating the fruit holder to bring the same into alignment with the snipping device and into alignment with the peeling mechanism, and means for advancing the fruit downwardly between the said jaws and into the peeling mechanism.

7. In a fruit peeling machine, the combination of a frame, a peeling mechanism supported on the frame, a snipping device mounted to one side of the peeling mechanism, a carriage guided to slide on the frame along a substantially horizontal line passing through the snipping device and the peeling mechanism, a fruit holder supported on the carriage comprising a pair of arms pivotally mounted on the carriage with a spring constraining the same toward each other, means for actuating the carriage to move the fruit holder into alignment with the snipping device and into alignment with the peeling mechanism, and means for engaging the fruit and advancing the same from the fruit holder through the peeling mechanism.

8. In a fruit peeling machine, the combination of a rotary fruit holding member having means for holding the fruit to rotate the same and permit the fruit to move through the holding means, a pair of peeling knives movably mounted on opposite sides of the axis of the holding means along which the fruit advances, and means for yieldably holding the peeling knives against the face of the fruit as it advances between them.

9. In a fruit peeling machine, the combination of a pair of rings mounted to rotate on a common axis and disposed apart to form a peeling space between them, peeling means mounted in the peeling space, said rings having means for impaling the fruit to cause the fruit to rotate with the rings, means for advancing the fruit through the rings and along the said axis, said peeling means having a peeling knife with means for yieldingly holding the same against the face of the fruit.

10. In a fruit peeling machine, the combination of a pair of rings mounted to rotate on a common axis and disposed apart to form a peeling space between them, said rings having aligned impaling blades for engaging the fruit and guiding the same, means for advancing the fruit through the rings and along the said axis, a peeling knife mounted in the peeling space to swing in a plane substantially transverse to the said axis, means for yieldingly holding the peeling knife against the face of the fruit, and means for rotating the said rings.

11. In a fruit peeling machine, the combination of a pair of rings mounted to rotate on a common axis and disposed apart to form a peeling space between them, said rings having diametrically opposite impaling blades to hold and guide the fruit, means for advancing the fruit along the said axis and past the impaling blades, the impaling blades of one ring being in alignment with the impaling blades of the other ring, a pair of peeling knives mounted in the peeling space to swing in a plane transverse to the said axis, means for yieldingly holding the peeling blades against the face of the fruit, and means for rotating the two rings at the same speed.

12. In a fruit peeling machine, the combination of a pair of rings mounted on a common axis and disposed apart to form a peeling space between them, one of said rings having a pair of diametrically opposite impaling blades projecting inwardly toward the said axis, the other of said rings having a diametrically disposed blade in alignment with the impaling blades, means for rotating the two rings in unison, means for advancing the fruit past the impaling blades and through the rings along the said axis, a peeling knife in the peeling space mounted to swing in a plane transverse to the said axis, and means for yieldingly holding the peeling knife against the face of the fruit.

13. In a fruit peeling machine, the combination of an upper table and a lower table, a rotary guiding and holding means for the fruit supported on the upper table, a rotary guiding means for the fruit at about the level of the lower table, means for advancing the fruit down through the guiding means, a peeling cutter shaft mounted to swing on a substantially vertical axis in the space between the tables, a cutter and a pulley carried by the shaft, said pulley being located so that its plane of rotation is substantially in the plane of the said axis and a substantially horizontal belt located between the tables with means for driving the same to rotate the peeling cutter shaft, and means for yieldingly holding the cutter against the face of the fruit.

14. In a fruit peeling machine, the combination of an upper table and a lower table, a rotary guiding and holding means for the fruit supported on the upper table, a rotary guiding means for the fruit at about the level of the lower table, means for advancing the fruit down through the guiding means, a pair of peeling cutter shafts mounted to swing respectively on substantially vertical pivots in the space between the tables, a cutter and pulley carried by each shaft, each pulley being located so that its plane of rotation is substantially in the plane of its pivotal axis, a belt shaft supported between the tables, and belts and pulleys connecting the same with the first named pulleys to drive the cutter shafts, and means for yieldingly pressing the cutter shafts in a direction to hold the cutters against the face of the fruit.

15. In a fruit peeling machine, a snipping device for snipping the stem end of the fruit, having a pair of oppositely disposed blades, means for supporting the blades to swing on a fixed axis, said blades being normally disposed apart so as to form a throat to permit the lower end of the fruit to be introduced between the edges of the blades, an actuating lever, a pair of links connecting the lever with the snipping blades, means for passing the fruit through the said throat, and means for moving the lever to actuate the blades to sever the end of the fruit.

16. In a fruit peeling machine, a snipping device for snipping the stem end of the fruit, having a pair of oppositely disposed blades with a fixed pivot, said snipping blades being normally disposed apart so as to form a throat into which the lower end of the fruit may be introduced, a fruit peeling mechanism, a fruit holder carriage guided to slide along a line joining the axis of rotation of the peeling device and the axis of rotation of the snipping blades, a fruit holder mounted on the carriage operating to move the fruit between the snipping device and the peeling mechanism, means for reciprocating the fruit holder carriage, links attached to the snipper blades, a lever carrying the said links, and means for actuating the lever to operate the snipper blades.

17. In a fruit peeling machine, the combination of a fruit holder carriage, means for guiding the same to slide in a substantially horizontal direction, a pair of fruit holding arms pivotally supported on the carriage, having jaws at their free ends with oppositely disposed rollers operating to form a cradle to receive the fruit, means for yieldingly pulling the holder arms toward each other, operating to permit the same to separate when the fruit is moved downwardly from the holder, a centering arm movably supported on the carriage and having means for engaging the upper portion of the fruit to hold the same upright between the holder arms.

18. In a fruit peeling machine, the combination of a fruit holder carriage, means for guiding the same to slide in a substantially horizontal direction, a pair of fruit holding arms pivotally supported on the carriage, having jaws at their free ends with oppositely disposed rollers operating to form a cradle to receive the fruit, means for yieldingly pulling the holder arms toward each other, operating to permit the same to separate when the fruit is moved downwardly from the holder, a centering arm movably supported on the carriage and having means for engaging the upper portion of the fruit to hold the same upright between the holder arms, a fruit peeling mechanism on the line in which the carriage reciprocates and means for moving the fruit out of engagement with the holder arms and into the peeling mechanism.

19. In a fruit peeling machine, the combination of a peeling mechanism, guiding means for supporting and guiding the fruit, means for advancing the fruit past the peeling mechanism, means for producing a relative rotary movement between the fruit and the peeling mechanism to remove the peel, a blade mounted to move transversely to the axis of the fruit, and means for actuating the blade to snip the flower end of the fruit while supported by said guiding means.

20. In a fruit peeling machine, the combination of a peeling mechanism, a pusher stem for advancing the fruit past the peeling mechanism, means for producing a relative rotary movement between the peeling mechanism and the fruit to remove the peel, a cam for controlling the pusher stem operating to advance the fruit during the peeling operation, and operating to arrest the advance of the fruit after the peeling has been removed, a knife mounted to swing across the axis of the fruit, and automatic means for actuating the knife to snip the flower end of the fruit.

21. In a fruit peeling machine, the combination of a rotary peeling mechanism, a snipping device disposed adjacent the same for snipping the stem end of the fruit, a carriage guided along the line joining the snipper device and the axis of the peeling mechanism, a fruit holder mounted on the carriage, means for actuating the carriage to move the fruit from the snipping device into alignment with the peeling mechanism, a pusher stem, means for actuating the stem to move the fruit from the holder past the peeling mechanism, said means operating to arrest the advance of the fruit after the same has been peeled, a snipper for cutting off the flower end of the fruit and having a blade movable transversely to the axis of the fruit, and means for actuating the said blade.

Signed at San Francisco, Calif., this 3rd day of October, 1927.

HJALMAR GORANSON.
DAVID GORANSON.